(12) United States Patent
Shimon et al.

(10) Patent No.: US 8,767,193 B2
(45) Date of Patent: Jul. 1, 2014

(54) DOPPLER TRACKING IN PRESENCE OF VEHICLE VELOCITY UNCERTAINTY

(75) Inventors: Philip T. Shimon, Torrance, CA (US); Kenneth E. Prager, Granite Bay, CA (US); Lloyd J. Lewins, Marina Del Ray, CA (US)

(73) Assignee: Raytheon Company, Waltham, MA (US)

( * ) Notice: Subject to any disclaimer, the term of this patent is extended or adjusted under 35 U.S.C. 154(b) by 202 days.

(21) Appl. No.: 13/545,117

(22) Filed: Jul. 10, 2012

(65) Prior Publication Data

US 2014/0016115 A1 Jan. 16, 2014

(51) Int. Cl.
*G01P 3/36* (2006.01)

(52) U.S. Cl.
CPC ...................................... *G01P 3/36* (2013.01)
USPC ......................................................... 356/28.5

(58) Field of Classification Search
CPC ....... G01C 3/08; G01P 3/36; G01N 2291/017
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 5,101,271 A | 3/1992 | Andrews et al. | |
| 5,128,884 A | 7/1992 | Prager | |
| 5,278,644 A | 1/1994 | Lewins et al. | |
| 5,302,824 A | 4/1994 | Prager | |
| 5,302,964 A | 4/1994 | Lewins | |
| 5,371,533 A | 12/1994 | Lewins | |
| 5,471,240 A | 11/1995 | Prager et al. | |
| 5,602,760 A | 2/1997 | Chacon et al. | |
| 5,640,469 A | 6/1997 | Lewins et al. | |
| 5,696,578 A | 12/1997 | Ishida et al. | |
| 5,726,915 A | 3/1998 | Prager et al. | |
| 6,775,248 B1 | 8/2004 | Farwell et al. | |
| 6,895,102 B2 | 5/2005 | Lewins et al. | |
| 6,920,545 B2 | 7/2005 | Farwell et al. | |
| 7,061,592 B2 | 6/2006 | Deines | |
| 7,073,384 B1 | 7/2006 | Donskoy et al. | |
| 7,746,450 B2 * | 6/2010 | Willner et al. | 356/28 |
| 7,911,375 B2 | 3/2011 | Winstead et al. | |
| 2005/0237533 A1 | 10/2005 | Lal et al. | |
| 2009/0113083 A1 | 4/2009 | Lewins et al. | |
| 2009/0147267 A1 | 6/2009 | Lawall | |
| 2011/0037970 A1 | 2/2011 | Rogers et al. | |
| 2011/0188113 A1 | 8/2011 | Dede et al. | |

FOREIGN PATENT DOCUMENTS

| | | |
|---|---|---|
| CN | 102162217 A | 8/2011 |
| EP | 1148321 A2 | 10/2001 |
| WO | 2006124939 A2 | 11/2006 |

OTHER PUBLICATIONS

Bosch et al.: "Self-Mixing Laser Diode Velocimetry: Application to Vibration and Velocity Measurement", IEEE Transactions on Instrumentation and Measurement, IEE Service Center, Piscataway, NJ, US, vol. 53, No. 1, Feb. 1, 2004, pp. 223-232, XP011105501.

* cited by examiner

*Primary Examiner* — Luke Ratcliffe
(74) *Attorney, Agent, or Firm* — Burns & Levinson LLP; Joseph M. Maraia

(57) ABSTRACT

Methods for tracking the relative velocity between a vehicle and a target that uses both a measured velocity as well as an estimate of the velocity that is based on tracking the peaks in a laser vibrometer return signal.

14 Claims, 5 Drawing Sheets

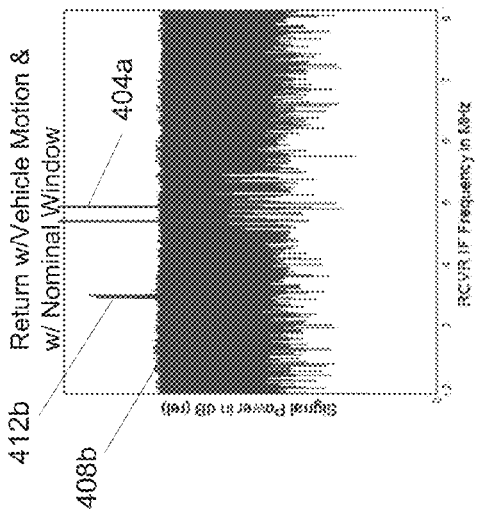
FIG. 4a Nominal Return w/ Nominal Window
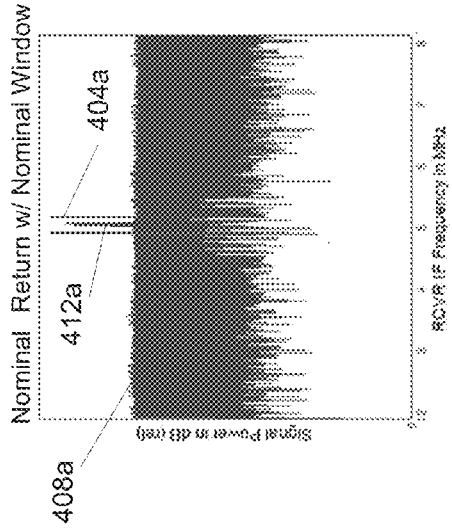
FIG. 4b Return w/Vehicle Motion & w/ Nominal Window
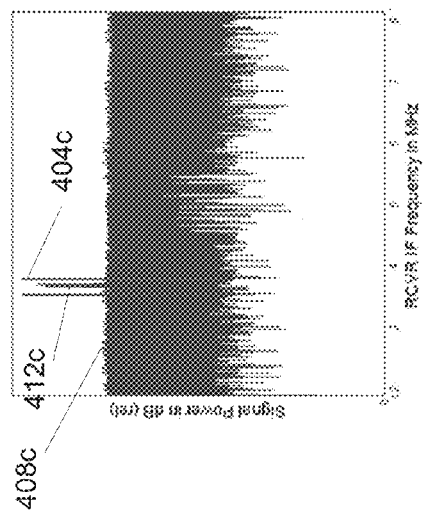
FIG. 4c Corrected window location

DOPPLER TRACKING IN PRESENCE OF VEHICLE VELOCITY UNCERTAINTY

GOVERNMENT SUPPORT

The invention was supported, in whole or in part, by a grant, Grant No. W909MY-07-C-0018, from the Department of Defense. The Government has certain rights in the invention.

BACKGROUND

Laser vibrometers measure the relative velocity between the laser and a target by measuring the Doppler frequency shift of the laser return from the target. The motion of the laser can affect the accuracy of the velocity measurement. A need therefore exists for improved methods and systems for tracking the relative velocity between a laser vibrometer and a target.

SUMMARY

The technology described herein relates to the use of a laser vibrometer for measuring the relative velocity between the laser and a target that involves measuring the Doppler frequency shift of the laser return from the target. Because the motion of the laser can be larger than the target motion, an inertial navigation system (INS) is used to measure the laser motion. There is, however, uncertainty in the velocity measurement data associated with an INS. The uncertainty can result in the laser return being lost or can result in the system tracking an adjacent frequency to the true frequency of the laser, thereby yielding erroneous velocity results. The technology described herein tracks the laser return in spite of the uncertainty in the velocity measurement data. One benefit of the technology is that by using a combination of peak tracking (of the laser vibrometer signals) and navigator (INS) measurements, the tracking system is able to maintain a lock on the target and accurately provide the relative velocity between the vehicle and target, and absolute velocity of the target.

One embodiment is a method for tracking the relative velocity between a vehicle and a target. The method includes a) determining a velocity of the vehicle based on inertial measurements acquired for the vehicle. The method also includes b) determining a velocity vector signal of the vehicle along a line of sight of a laser vibrometer on the vehicle, wherein the laser vibrometer has a nominal window in the frequency domain centered around an operating frequency of the laser vibrometer. The method also includes c) converting the velocity vector signal to a Doppler frequency velocity estimate and d) subtracting a Doppler frequency velocity error from the Doppler frequency velocity estimate to create a corrected Doppler frequency velocity estimate. The method also includes e) creating an updated window by shifting the nominal window's center frequency by the corrected Doppler frequency velocity estimate of step d). The method also includes f) acquiring velocity measurements of the vehicle relative to the target using the laser vibrometer on the vehicle. The method also includes g) converting the laser vibrometer velocity measurements to frequency data. The method also includes h) overlaying the updated window from step e) onto the frequency data from step g). The method also includes i) determining from step h) which frequency within the updated window has the largest magnitude signal. The method also includes j) determining the Doppler frequency velocity error by subtracting the corrected Doppler frequency velocity estimate of step d) from the frequency within the updated window having the largest magnitude signal of step i).

In some embodiments, the method includes k1) determining a Doppler frequency of the target velocity by subtracting the Doppler frequency velocity estimate of step c) from the frequency within the updated window having the largest magnitude signal of step i) and l) converting the signal in step k1) to an absolute velocity signal of the target. In some embodiments, the method includes low pass filtering the Doppler frequency velocity error after step j).

In some embodiments, the method includes k2) determining a Doppler frequency of the target velocity by subtracting the corrected Doppler frequency velocity estimate of step d) from the frequency within the updated window having the largest magnitude signal of step i) and l) converting the signal in step k2) to an absolute velocity signal of the target. In some embodiments, laser vibrometer velocity measurements having a carrier to noise ratio above a predefined threshold are used.

In some embodiments, the method includes initially performing steps a) and b) when the vehicle is at a known velocity. In some embodiments, the known velocity is a constant velocity or zero velocity. In some embodiments, the method includes initially performing step i) for multiple iterations over a nominal window size that bounds the frequency data of step g) and the frequency having the largest magnitude signal. In some embodiments, the target has a zero mean velocity. In some embodiments, step f) includes acquiring velocity measurements of the vehicle relative to the target using a plurality of laser vibrometers.

Another embodiment is a system for determining relative velocity between a vehicle and a target. The system includes a processor and a memory. The memory includes code representing instructions that when executed cause the processor to a) determine a velocity of the vehicle based on inertial measurements acquired for the vehicle and b) determine a velocity vector signal of the vehicle along a line of sight of a laser vibrometer on the vehicle, wherein the laser vibrometer has a nominal window in the frequency domain centered around an operating frequency of the laser vibrometer. The memory includes code representing instructions that when executed cause the processor to c) convert the velocity vector signal to a Doppler frequency velocity estimate and d) subtract a Doppler frequency velocity error from the Doppler frequency velocity estimate to create a corrected Doppler frequency velocity estimate. The memory includes code representing instructions that when executed cause the processor to e) create an updated window by shifting the nominal window's center frequency by the corrected Doppler frequency velocity estimate of step d). The memory includes code representing instructions that when executed cause the processor to f) acquire velocity measurements of the vehicle relative to the target using the laser vibrometers on the vehicle and g) convert the laser vibrometer velocity measurements to frequency data. The memory includes code representing instructions that when executed cause the processor to h) overlay the updated window from step e) onto the frequency data from step g) and i) determine from step h) which frequency within the updated window has the largest magnitude signal. The memory includes code representing instructions that when executed cause the processor to j) determine the Doppler frequency velocity error by subtracting the corrected Doppler frequency velocity estimate from the frequency within the updated window having the largest magnitude signal of step i).

In some embodiments, the memory includes code representing instructions that when executed cause the processor to k1) determining a Doppler frequency of the target velocity by subtracting the Doppler frequency velocity estimate of step c) from the frequency within the updated window having the largest magnitude signal of step i) and l) converting the signal in step k1) to an absolute velocity signal of the target. In some embodiments, the memory includes code representing instructions that when executed cause the processor to low pass filter the Doppler frequency velocity error after step j). In some embodiments, the memory includes code representing instructions that when executed cause the processor to k2) determining a Doppler frequency of the target velocity by subtracting the corrected Doppler frequency velocity estimate of step d) from the frequency within the updated window having the largest magnitude signal of step i) and l) converting the signal in step k2) to an absolute velocity signal of the target.

Other aspects and advantages of the current invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed descriptions in the accompanying drawings.

FIGS. 4a-4e are graphs depicting data for an experiment conducted, according to an illustrative embodiment.

DETAILED DESCRIPTION OF ILLUSTRATIVE EMBODIMENTS

Figure 1:
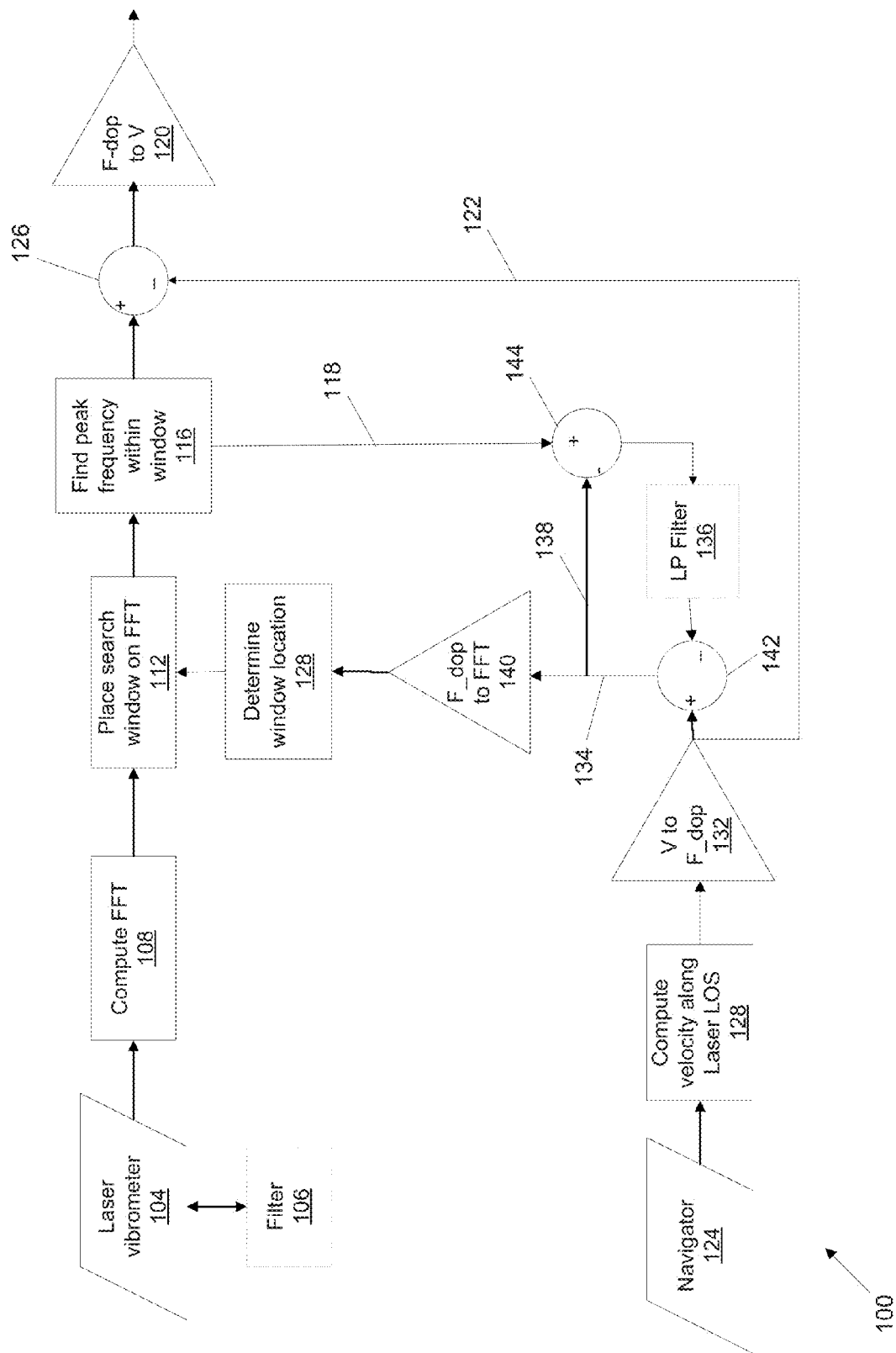
FIG. 1 is a flowchart of a method for tracking the relative velocity between a vehicle and a target, according to an illustrative embodiment.

FIG. 1 is a flowchart 100 of a method for tracking the relative velocity between a vehicle (or some other moving system) and a target, according to an illustrative embodiment. The velocity of the vehicle, relative to the target, is determined (output of step 120) by the method described further below. The vehicle includes a laser vibrometer and an inertial navigation system (also referred to as a navigator). A laser vibrometer (also referred to as a vibrometer or laser Doppler vibrometer) is an instrument used to perform non-contact vibration measurements of a surface. A vibrometer typically generates two laser beams, an internal reference laser beam and a test beam. The test beam is directed to the surface of interest. The vibrometer measures the frequency difference (or equivalently, phase difference) between the internal reference laser beam and the test beam return signal. The laser vibrometer output is typically an analog voltage signal that is proportional to the relative velocity (along the line of sight of the laser) between the laser vibrometer (i.e., the structure to which the laser vibrometer is attached) and the surface of interest (or target).

Inertial navigation systems are instruments that continuously determine the position, orientation and velocity of a moving object (i.e., the structure supporting the laser vibrometer in this embodiment) after receiving initial values of position, orientation and/or velocity without the need for receiving external references measurements on an ongoing basis. The systems include motion sensors (e.g., accelerometers) and rotation sensors (e.g., gyroscopes) that are used to determine the position, orientation and velocity.

The method includes determining (step 124) the velocity of the vehicle based on inertial measurements generated by the navigator to which the navigator is attached. The vehicle velocity is then used to determine (step 128) the velocity vector signal of the vehicle along the line of sight of the laser vibrometer of the vehicle based on the vehicle velocity determined in step 124. The velocity along the line of sight of the laser vibrometer is determined based on the vehicle velocity and the orientation of the navigator relative to the line of sight of the laser vibrometer. If the measurement axes of the navigator (typically three orthogonal axes) are not aligned with the line of sight of the laser vibrometer, a coordinate transformation can be used to determine the velocity along the line of sight.

In some embodiments, it is beneficial to initiate operation of the system when the vehicle velocity is a known velocity (e.g., stationary, a known, fixed velocity, or a zero mean velocity). A known velocity allows for the computation of a known Doppler frequency using the equation $$\Delta f_{initial} = \frac{2 \cdot v_{known}}{\lambda}$$

where $v_{known}$ is the known velocity of the sensor and $\lambda$ is the wavelength of the laser. This starts the system in the proper configuration and allows the feedback loop to maintain track.

The velocity computed in step 128 is then converted to a Doppler frequency velocity estimate (step 132) using the equation $$\Delta f = \frac{2 \cdot v}{\lambda}$$

where v is the relative velocity between the target and sensor and $\lambda$ is the wavelength of the laser.

The summing junction 144 generates a Doppler frequency velocity error that is low pass filtered (step 136). The low pass filtering step (136) is optional; however, it is effective in some embodiments for rejecting bad or faulty measurements in the system during the iterative process described in FIG. 1. In this embodiment, the filtered Doppler frequency velocity error 142 is subtracted from the Doppler frequency velocity estimate (output of step 132) to produce a corrected Doppler frequency velocity estimate 134. The corrected Doppler frequency velocity estimate 134 is updated in an iterative fashion for subsequent cycles, as illustrated by the signal path 138.

A fast Fourier transform (FFT) is then applied to the corrected Doppler frequency velocity estimate (step 140). The output of step 140 is then processed to create an updated window in the frequency domain (step 128) by shifting the center frequency of a nominal window by the corrected Doppler frequency shift estimate. The nominal window is initially centered around the laser vibrometer operating frequency. The center frequency of the window is updated during each pass through the steps of the method.

The method also includes acquiring velocity measurements of the vehicle relative to the target using the laser vibrometer (step 104). In some embodiments, the method optionally includes filtering (step 106), or otherwise removing, laser vibrometer velocity measurements that do not have a carrier to noise ratio above a predefined threshold. The carrier to noise ratio is a ratio of the desired signal (magnitude of the laser vibrometer carrier signal) relative to the background noise in the vibrometer measurement. If, for example, the noise is very large relative to the carrier signal, it is difficult for the system to adequately distinguish between the noise and the carrier signal. This often results in faulty decisions being made based on the carrier signal. Measurements below the threshold could affect the accuracy of the system and could be, for example, due to the test beam signal reflecting off the target such that the test beam return signal does not properly return to the laser vibrometer. In some embodiments, two or more laser vibrometer channels are used and the method includes acquiring velocity measurements of the vehicle relative to the target using each of the laser vibrometer channels.

Next, an FFT is computed on the velocity measurements (step 108) to convert the measurements to frequency data. The updated window is then overlaid (step 112) onto the frequency data generated by step 108. By overlaying the updated window onto the frequency data, the system is then tasked with determining the frequency (step 116) of the frequency data within the updated window that has the largest magnitude signal (frequency with largest magnitude signal 118). The frequency having the largest magnitude signal is then used iteratively in summing junction 144 to calculate an updated Doppler frequency velocity error by subtracting the value of signal path 138 (which is the previous value of the corrected Doppler frequency velocity estimate 134) from the frequency 118. In some embodiments, the system initially searches through the entire set of frequency data generated by step 108 to identify the frequency (step 116) of the frequency data within the updated window that has the largest magnitude signal.

In some embodiments, the step 116 of finding the frequency of the frequency data within the updated window that has the largest magnitude signal involves performing a curve fit on adjacent frequencies to the largest magnitude signal. That allows you to find the peak frequency to a resolution that is less than a FFT bin. So because this frequency is not quantized to a bin, the value we subtract from it to get the error would not be quantized to a bin as well.

The method also includes determining the Doppler frequency of the target velocity by subtracting the Doppler frequency velocity estimate 122 from the output of step 116 with summing junction 126 ($\Delta f_{target} = \Delta f_{peak} - \Delta f_{velocityEstimate}$). The Doppler frequency is then converted (step 120) to an absolute velocity signal for the target using the equation $$v_{target} = \frac{\Delta f_{target} \cdot \lambda}{2}$$

where $\Delta f_{target}$ is computed above and $\lambda$ is the wavelength of the laser.

Figure 2:
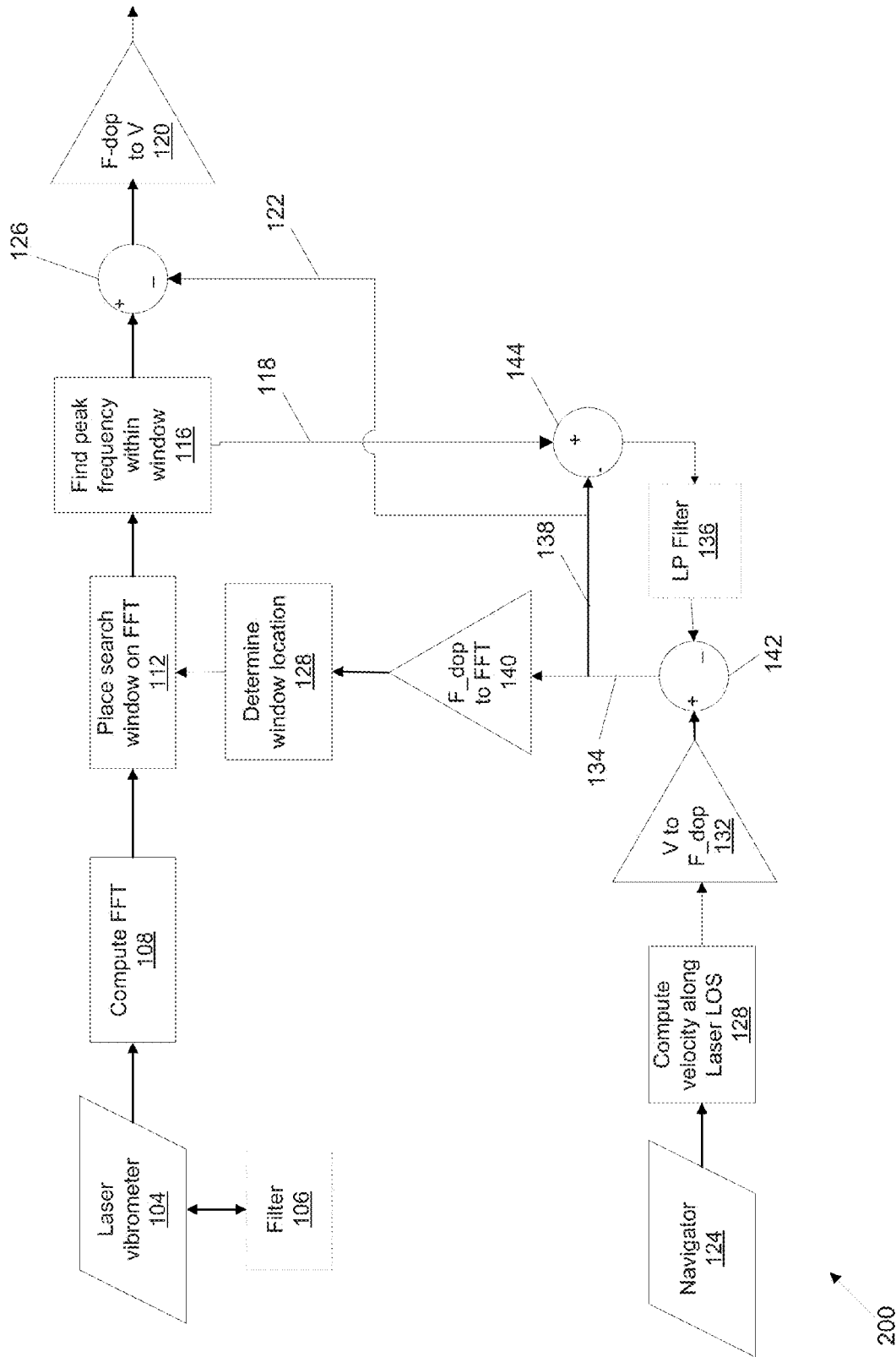
FIG. 2 is a flowchart of another method for tracking the relative velocity between a vehicle and a target, according to an illustrative embodiment.

FIG. 2 is a flowchart 200 of a method for tracking the relative velocity between a vehicle (and a target, according to an illustrative embodiment. The flowchart 200 of FIG. 2 is similar to the flowchart 100 of FIG. 1, but for one of the signals that this provided to summing junction 126. In this embodiment, the method includes determining the Doppler frequency of the target velocity by subtracting, with summing junction 126, the corrected Doppler frequency velocity estimate 134 from the output of step 116. The Doppler frequency is then converted (step 120) to an absolute velocity signal for the target.

Figure 3:
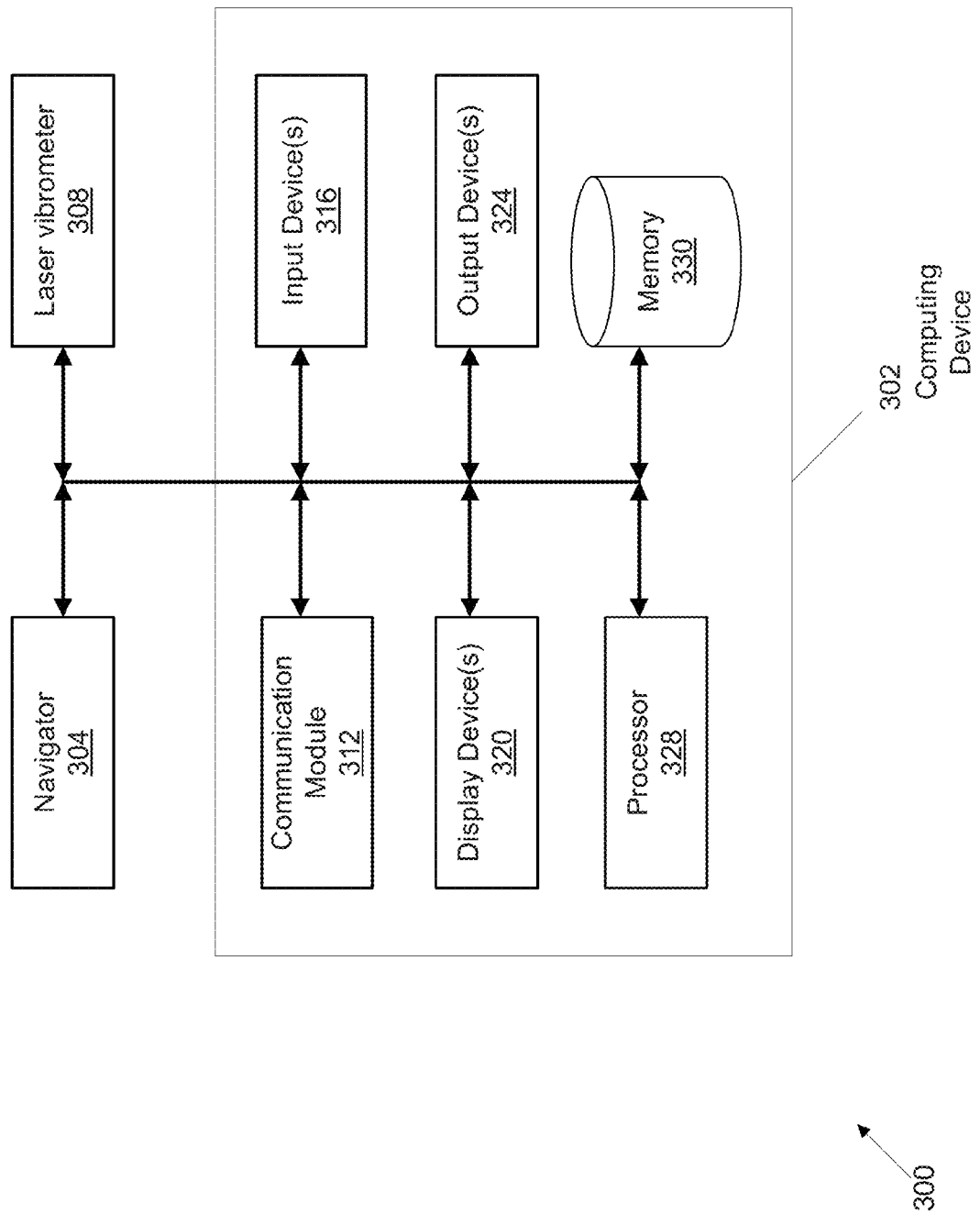
FIG. 3 is a schematic illustration of a system for tracking the relative velocity between a vehicle and a target, according to an illustrative embodiment.

FIG. 3 is a schematic illustration 300 of a computing device 302 for operating a system for determining the relative velocity between a vehicle and a target (e.g., in accordance with the flowchart 100 of the method of FIG. 1). The computing device 302 includes one or more input devices 316, one or more output devices 324, one or more display devices(s) 320, a processor 328, memory 330, and a communication module 312. The modules and devices described herein can, for example, utilize the processor 328 to execute computer executable instructions and/or the modules and devices described herein can, for example, include their own processor to execute computer executable instructions. It should be understood the computing device 302 can include, for example, other modules, devices, and/or processors known in the art and/or varieties of the described modules, devices, and/or processors.

The communication module 312 includes circuitry and code corresponding to computer instructions that enable the computing device to send/receive signals to/from the navigator 304 and laser vibrometer 308. The communication module 312 also, for example, outputs data corresponding to the velocity of the vehicle and target which can be stored by the memory 330 or otherwise processed by the processor 328 (e.g., used by a weapon system to lock on the target).

The input devices 316 receive information from a user (not shown) and/or another computing system (not shown). The input devices 310 can include, for example, a keyboard, a scanner, a microphone, a stylus, a touch sensitive pad or display. The output devices 314 output information associated with the computing device 302 (e.g., information to a printer, information to a speaker, information to a display, for example, graphical representations of information). The processor 328 executes the operating system and/or any other computer executable instructions for the computing device 302 (e.g., executes applications). The memory 330 stores a variety of information/data, including profiles used by the computing device 302 to specify how the imaging array should selectively attenuate one or more of the plurality of electromagnetic beams received from the diffraction grating or data associated with the spectrally altered version of the image. The memory 330 can include, for example, long-term storage, such as a hard drive, a tape storage device, or flash memory; short-term storage, such as a random access memory, or a graphics memory; and/or any other type of computer readable storage.

Figure 4E:
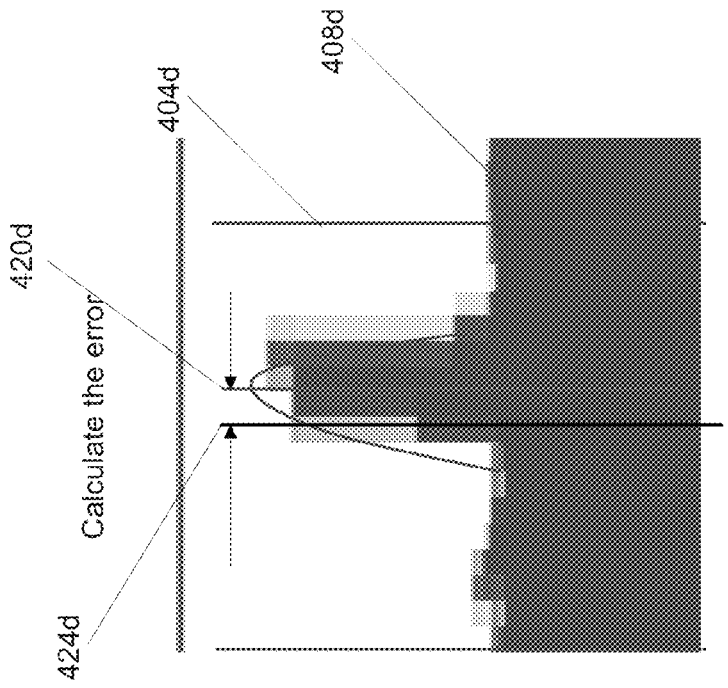

FIGS. 4a through 4e are graphs depicting data for an experiment conducted using principles of the method described herein in one illustrative embodiment. FIG. 4a is a graph (signal power in dB versus frequency) depicting the system window 404a overlaid with onto frequency data 408a (e.g., step 108 of FIG. 1) for a laser vibrometer (e.g., laser vibrometer 104 of FIG. 1) when the vehicle is not moving. The largest magnitude signal 412a is centered in the window 404a (at approximately 5 MHz). The methods described herein are used to remedy the situation in which the vehicle is moving and it is difficult to properly overlay the window onto the frequency data to be able to properly determine the frequency of the largest magnitude signal to properly compensate for the effect of the moving vehicle. FIG. 4b is a graph depicting the system window 404b overlaid with onto frequency data 408b when the vehicle is moving and when the principles of the method are not utilized. FIG. 4c illustrates the case where the window 404b is not centered on the largest magnitude signal 412b of the frequency data 408b. FIG. 4c is a graph depicting the system window 404c overlaid onto frequency data 408c when the vehicle is moving and when the principles of the method are utilized. FIG. 4c illustrates the case where the window 404c is centered on the largest magnitude signal 412c (at approximately 3.7 MHZ) of the frequency data 408c (due to performing, e.g., the step 116 of FIG. 1).

Figure 4D:
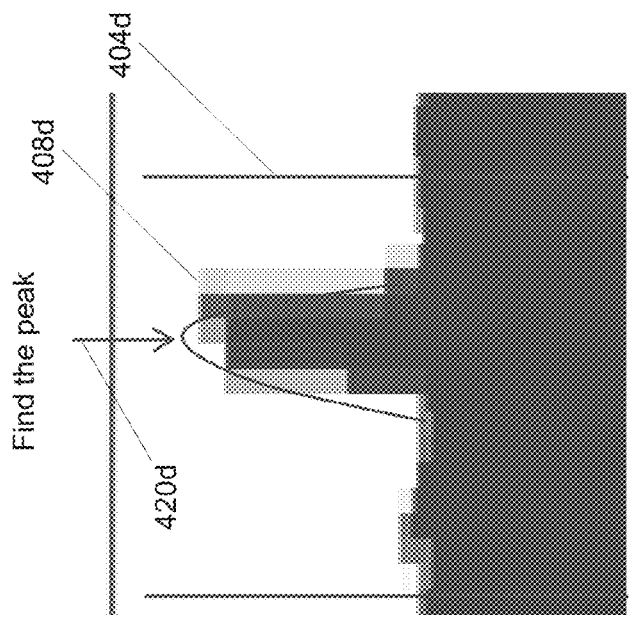

FIGS. 4d and 4e are graphs depicting the system window 404d overlaid onto frequency data 408d when the principles of the method are utilized. In this embodiment, the finding the frequency of the frequency data within the updated window that has the largest magnitude signal (e.g., step 116 of FIG. 1) involves performing a curve fit on adjacent frequencies to the largest magnitude signal. That allows you to find the peak frequency 408d to a resolution that is less than a FFT bin. The error is then calculated based on the peak frequency and the previous Doppler frequency velocity estimate (e.g., estimate 134 of FIG. 1).

The above-described systems and methods can be implemented in digital electronic circuitry, in computer hardware, firmware, and/or software. The implementation can be as a computer program product that is tangibly embodied in an information carrier. The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors, or one or more servers that include one or more processors, that execute a computer program to perform functions of the disclosure by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data. Magnetic disks, magneto-optical disks, or optical disks are examples of such storage devices.

Data transmission and instructions can occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method for tracking the relative velocity between a vehicle and a target; comprising:
   a) determining a velocity of the vehicle based on inertial measurements acquired for the vehicle;
   b) determining a velocity vector signal of the vehicle along a line of sight of a laser vibrometer on the vehicle, wherein the laser vibrometer has a nominal window in the frequency domain centered around an operating frequency of the laser vibrometer;
   c) converting the velocity vector signal to a Doppler frequency velocity estimate;
   d) subtracting a Doppler frequency velocity error from the Doppler frequency velocity estimate to create a corrected Doppler frequency velocity estimate;
   e) creating an updated window by shifting the nominal window's center frequency by the corrected Doppler frequency velocity estimate of step d);
   f) acquiring velocity measurements of the vehicle relative to the target using the laser vibrometer on the vehicle;
   g) converting the laser vibrometer velocity measurements to frequency data;
   h) overlaying the updated window from step e) onto the frequency data from step g);
   i) determining from step h) which frequency within the updated window has the largest magnitude signal; and
   j) determining the Doppler frequency velocity error by subtracting the corrected Doppler frequency velocity estimate of step d) from the frequency within the updated window having the largest magnitude signal of step i).

2. The method of claim 1, comprising:
   k1) determining a Doppler frequency of the target velocity by subtracting the Doppler frequency velocity estimate of step c) from the frequency within the updated window having the largest magnitude signal of step i); and
   l) converting the signal in step k1) to an absolute velocity signal of the target.

3. The method of claim 1, comprising low pass filtering the Doppler frequency velocity error after step j).

4. The method of claim 1, comprising:
   k2) determining a Doppler frequency of the target velocity by subtracting the corrected Doppler frequency velocity estimate of step d) from the frequency within the updated window having the largest magnitude signal of step i); and
   l) converting the signal in step k2) to an absolute velocity signal of the target.

5. The method of claim 1, wherein laser vibrometer velocity measurements having a carrier to noise ratio above a predefined threshold are used.

6. The method of claim 1, comprising initially performing steps a) and b) when the vehicle is at a known velocity.

7. The method of claim 6, wherein the known velocity is a constant velocity or zero velocity.

8. The method of claim 1, comprising initially performing step i) for multiple iterations over a nominal window size that bounds the frequency data of step g) and the frequency having the largest magnitude signal.

9. The method of claim 1, wherein the target has a zero mean velocity.

10. The method of claim 1, wherein step f) comprises acquiring velocity measurements of the vehicle relative to the target using a plurality of laser vibrometers.

11. A system for determining relative velocity between a vehicle and a target; comprising:
   a processor; and
   a memory, the memory including code representing instructions that when executed cause the processor to:
   a) determine a velocity of the vehicle based on inertial measurements acquired for the vehicle;
   b) determine a velocity vector signal of the vehicle along a line of sight of a laser vibrometer on the vehicle, wherein the laser vibrometer has a nominal window in the frequency domain centered around an operating frequency of the laser vibrometer;
   c) convert the velocity vector signal to a Doppler frequency velocity estimate;
   d) subtract a Doppler frequency velocity error from the Doppler frequency velocity estimate to create a corrected Doppler frequency velocity estimate;
   e) create an updated window by shifting the nominal window's center frequency by the corrected Doppler frequency velocity estimate of step d);
   f) acquire velocity measurements of the vehicle relative to the target using the laser vibrometers on the vehicle;
   g) convert the laser vibrometer velocity measurements to frequency data;
   h) overlay the updated window from step e) onto the frequency data from step g);
   i) determine from step h) which frequency within the updated window has the largest magnitude signal;
   j) determine the Doppler frequency velocity error by subtracting the corrected Doppler frequency velocity estimate from the frequency within the updated window having the largest magnitude signal of step i).

12. The system of claim 11, wherein the memory includes code representing instructions that when executed cause the processor to:
   k1) determining a Doppler frequency of the target velocity by subtracting the Doppler frequency velocity estimate of step c) from the frequency within the updated window having the largest magnitude signal of step i); and
   l) converting the signal in step k1) to an absolute velocity signal of the target.

13. The system of claim 11, wherein the memory includes code representing instructions that when executed cause the processor to low pass filter the Doppler frequency velocity error after step j).

14. The system of claim 11, wherein the memory includes code representing instructions that when executed cause the processor to:
   k2) determining a Doppler frequency of the target velocity by subtracting the corrected Doppler frequency velocity estimate of step d) from the frequency within the updated window having the largest magnitude signal of step i); and
   l) converting the signal in step k2) to an absolute velocity signal of the target.

* * * * *